E. SEELIG.
DIRIGIBLE AIRSHIP.
APPLICATION FILED MAR. 11, 1910.
1,008,437.
Patented Nov. 14, 1911.
2 SHEETS—SHEET 2.
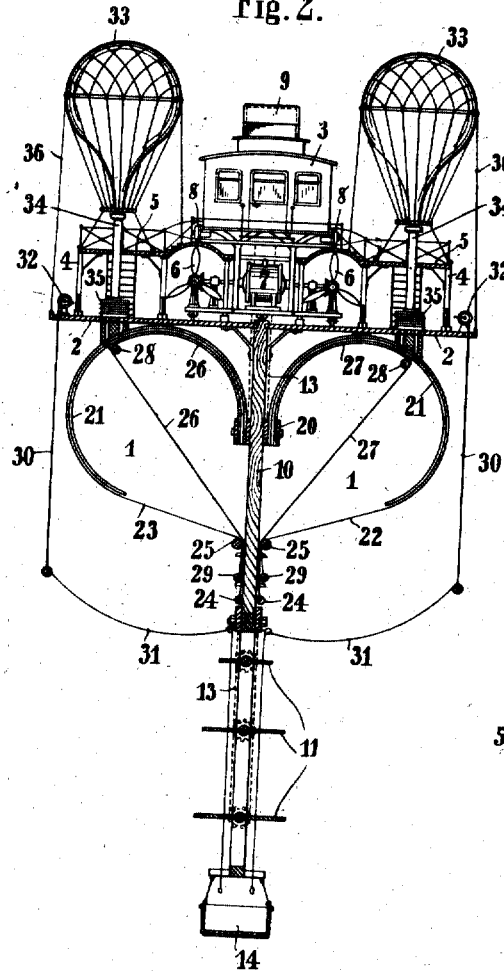
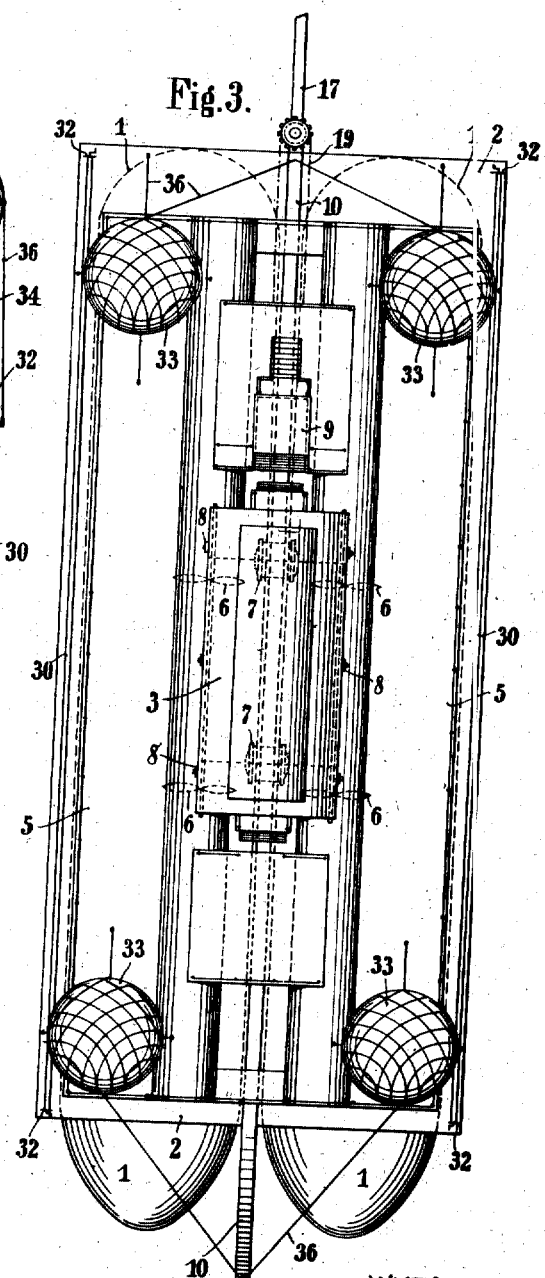
WITNESSES:
N. H. Berrigan
Alfred R. Anderson
INVENTOR,
EDMUND SEELIG
by Hran Dedennal
Attorney

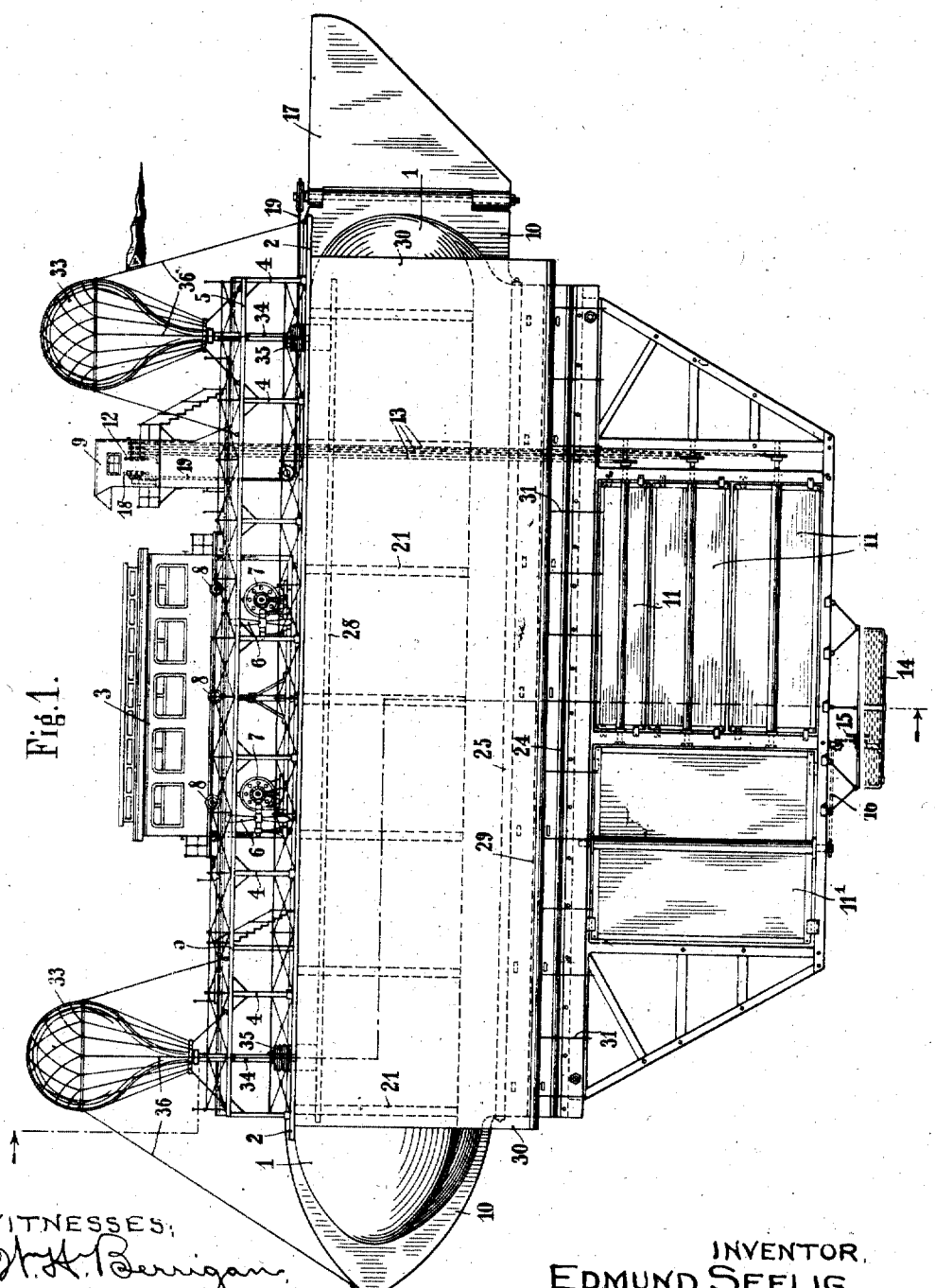

UNITED STATES PATENT OFFICE.

EDMUND SEELIG, OF BERLIN, GERMANY.

DIRIGIBLE AIRSHIP.

1,008,437.   Specification of Letters Patent.   Patented Nov. 14, 1911.

Application filed March 11, 1910. Serial No. 548,649.

*To all whom it may concern:*

Be it known that I, EDMUND SEELIG, a subject of the German Emperor, and resident of Berlin, Germany, have invented a certain new and useful Improvement in Dirigible Airships, of which the following is a specification.

This invention relates to that class of dirigible airship which is supported by aerostats. In known airships of this kind as also in rigid, semi-rigid and in non-rigid systems the car carrying the passengers and the machinery is arranged beneath the aerostat and either flexibly connected therewith by means of ropes or rigidly connected with the balloon body. The disadvantages of this arrangement consist firstly in the danger of explosion especially when explosion motors are used to propel the airship as ascending flames or hot gases might cause an explosion of the gas in the aerostat. Secondly the aerostat is not protected against rotating parts which may be thrown off by centrifugal force; such as for example, propeller blades. Again, landing from cars arranged beneath the aerostat in flexible or semi-rigid systems is attended with great difficulty and the utmost caution must be maintained because in such cases the most sensitive and least resilient part, namely the car first comes in contact with the ground.

A further disadvantage of known dirigible airships supported by aerostats consists in this that these aerostats when filled with gas have a constant volume so that on rise of temperature taking place as for example when the airship reaches warm layers of air or is heated by the sun, in order to prevent dangerous pressures, gas must be released on account of the extension of the inclosed gas. When the airship reaches colder zones and the temperature falls the gas in the interior of the ballon contracts so that the balloon envelop becomes slack or if this is to be prevented as is necessary in non-rigid and semi-rigid systems, balloonets must be provided in the interior of the aerostat which must be pumped full of air so that the necessary rigidity of the envelop may be maintained even with a reduction in the buoyancy.

The subject of this invention is an improved dirigible airship which avoids these two principal disadvantages namely the arrangement of a car beneath the aerostats and the constant volume of the same in taut condition and thereby imparts a number of further advantages which are hereinafter pointed out.

The main feature of the invention consists in the arrangement of a platform acting after the manner of an aeroplane and forming the supporting frame and arranged over the aerostat in connection with the special formation of the aerostat itself maintaining the variable volume in a continually taut condition.

The aerostat consists of an envelop laid over rigid ribs, the ends of which envelop are stretched over rollers arranged adjacent one another and controlled by weights or springs so that when the pressure in the interior of the envelop increases, the envelop is moved outward against the action of the weights or springs and therewith the space inclosed is enlarged while when pressure falls the envelop under the action of the weights or springs moves inward, the space in the interior being thereby reduced.

The arrangement of the platform above the aerostat further allows the direct drive of the propellers from the motors and further permits an extremely precise elevation and descent by shifting the center of gravity toward the front or rear by moving the whole casing carrying the machinery and passengers along the platform. In view of the weight of the whole casing together with the machinery a slight movement only of the same forward and backward on the platform has a great effect in causing the airship to ascend or descend. Special elevating planes are therefore quite superfluous. The platform in combination with the particular formation of the aerostat further permits the arrangement of a vertical keel in the center of the ship by means of which the stability is considerably enhanced during flight. This keel is provided with planes arranged in recesses therein.

In the accompanying drawing, Figure 1 is a side elevation of the airship; Fig. 2 is a transverse sectional view taken on line 2—2 of Fig. 1, and Fig. 3 is a plan of the airship.

Over the aerostat which may be of extended torpedo shape is arranged a platform 2 which on ascent or descent and also in horizontal flight acts on the airships after the manner of an aeroplane. On this platform 2, the casing or compartment 3 carrying the machinery and passengers is movably mounted in the following manner:—On supports 4 on the platform 2 is arranged a platform 5, and on these supports suitable closures may be carried, so that a passage open at the front and closed at both sides is formed between the two platforms 2 and 5. In this passage are arranged the propellers 6 which preferably are arranged symmetrically with respect to the motors 7 and are directly coupled therewith. A set of propellers and motors are arranged at the forward end and a set at the rear end of this passage between platforms 2 and 5. This arrangement of the propellers causes the air drawn in to be well guarded and thereby gives to the propellers a high efficiency. The casing or cabin 3 in which the propellers 6 together with the motors 7ª are carried, is movable longitudinally of the platform 5 on rollers 8 so that the center of gravity of the whole airship can be moved forward or rearward according to the position of this casing or compartment 3 and therewith the vertical direction of flight may be controlled. The control and regulation of the motors 7 and of the elevation can be effected either from inside the casing 3 or from a bridge 9 from which all the steering members may be operated.

Vertically beneath the center of the platform 5 is arranged a rigid plate 10, serving or acting as a keel and also serving to carry the skeleton of the aerostat. In the lower part of this plate 10 and in suitable openings therein are provided planes 11 pivoted about horizontal axes and planes 11¹ pivoted about vertical axes. This keel 10 and the pivoted planes 11 and 11¹ increase the lateral stability of the flying machine to a considerable extent. The operation of the planes 11 is controlled from the bridge 9 by means of capstans 12 and a chain, rope or belt drive 13. The adjustment of the planes 11¹ on the other hand is effected by means of a chain or belt drive actuated from a small car 14 suspended at the lower end of the keel.

At the rear end of the airship is further provided a rudder 17 pivoted about a vertical axis and adapted to be controlled from the bridge 9 by means of a capstan 18 through the medium of a rope, belt or chain drive 19.

The aerostats are arranged beneath the platform 2 in the following manner. These aerostats are formed from rods bent to an approximately semi-cylindrical shape secured to the keel 10 by bolts 20 and forming with connecting strips the skeletons of the aerostats. Over the skeletons are laid the balloon envelops 22 and 23 one edge of each of which is rigidly secured to the bolts 20, while the other edges are weighted by weights 29 and are guided over rollers 25 carried adjacent one another on the keel 10. In the construction shown in the drawings the lower edges of the balloon envelops are movable but the reverse may be the case, the lower edges may be fixed and the upper edges movable. In order to subdivide the interior of the envelops into compartments, envelops 26 and 27 are also provided on the inner side of the rods 21 and are held by the pressure of the gas tightly against those rods one edge being also secured to the bolts 20. The other ends of the envelops 26 and 27 are passed over guiding rods or rollers 28 mounted on the rods 21 and also over rollers 25 and are weighted by weights 24. There will be no leakage between the lower edges of the envelops as the gas floats in the upper part thereof. It is clear that on rise of pressure in the interior of the space inclosed by the envelops 22 and 23 and subdivided by the envelops 26 and 27, these envelops move outward against the action of the weights 24 and 29 so that the whole size of the balloon increases, whereas when the pressure decreases the envelops move inward under the action of the weights 24 and 29 the space inclosed being thereby diminished. In this manner an aerostat having a variable capacity according to the gas pressure and having a continuously taut surface is produced and the disadvantages present in balloons of constant volumes are avoided. In order to protect the aerostat from the sun's rays and thereby also to prevent loss in diffusion of the gases, blinds 30 may be hung at the sides of the platform 2. These may be pulled down by means of cords 31 from the basket 14 but can be raised by windlasses on the platform 2.

For greater safety over the aerostats and over the platform 2 are arranged four ballonnets 33 which are connected by extensive bellows. These ballonnets are normally filled three quarters full of gas and are connected with the aerostats by valves controlled from the bridge 9. In case of damage to the main aerostats and escape of the gas therefrom the connecting valves to the ballonnets 33 are opened from the bridge 9 so that gas may flow into these auxiliary balloons 33. These auxiliary ballonnets can be used as parachutes after the cord 36 is detached when the airship is falling too rapidly. The center of gravity of the airship is well below the center of buoyancy, as the framework of the keel is relatively heavy while the parts above the center of buoyancy are relatively light.

What I desire to secure by Letters Patent is:—

1. A dirigible airship comprising gas containing bodies, an aeroplane arranged above said bodies and increasing the lifting effect thereof, a carriage upon the aeroplane and movable longitudinally thereon after the manner of a traveling crane, and propelling machinery in said carriage, the movement of said carriage varying the inclination of the airship horizontally, for the ascent or descent of the same.

2. A dirigible airship comprising gas containing bodies, two platforms acting as aeroplanes and arranged over the said bodies, a carriage movable longitudinally of said platforms, propelling machinery on said carriage, a keel arranged beneath said platforms and rigidly connected therewith and provided with openings, and horizontally and vertically pivoted planes in said openings.

3. A dirigible airship comprising a pair of frames, lower rollers disposed below the frames, envelops disposed over said frames and guided over said rollers, upper rollers in the upper part of the frame, and additional envelops guided diagonally of the first envelops and over the upper and lower rollers, and weights below the lower rollers and attached respectively to the edges of the several envelops.

4. A dirigible airship comprising a pair of frames, lower rollers disposed below the frames, envelops disposed over said frames and guided over said rollers, upper rollers in the upper part of the frame, and additional envelops guided diagonally of the first envelops and over the upper and lower rollers, and weights below the lower rollers attached respectively to the edges of the several envelops, and lateral blinds suspended at the outer sides of the envelops for protecting the same from the rays of the sun.

5. A dirigible airship comprising gas containing bodies, two platforms acting as aeroplanes and arranged over the said bodies, a carriage movable longitudinally of said platforms, propelling machinery on said carriage, a keel arranged beneath said platforms and rigidly connected therewith and provided with openings, horizontally and vertically pivoted planes in said openings, ballonnets arranged over said bodies and pipes connecting the ballonnets with the bodies, said bodies being adapted to alter their shape according to the pressure in the interior thereof.

In testimony whereof I have signed my name to this specification in the presence of two subscribing witnesses.

EDMUND SEELIG.

Witnesses:
HENRY HASPER,
WOLDEMAR HAUPT.